US012509365B2

(12) United States Patent
Pacheco-Ruiz et al.

(10) Patent No.: US 12,509,365 B2
(45) Date of Patent: Dec. 30, 2025

(54) SIMULTANEOUS PHASE OPERATED ANAEROBIC SEQUENTIAL BATCH REACTION SYSTEM WITH BATCH DEGASSING UNIT AND SEMI-CONTINUOUS SETTLING UNIT

(71) Applicant: Veolia Water Solutions & Technologies Support, Saint Maurice (FR)

(72) Inventors: Santiago Pacheco-Ruiz, Maassluis (NL); Jeronimus Gerardus Maria Van Der Lubbe, Rijswijk (NL)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 640 days.

(21) Appl. No.: 17/791,857

(22) PCT Filed: Jan. 13, 2021

(86) PCT No.: PCT/EP2021/050517
§ 371 (c)(1),
(2) Date: Jul. 8, 2022

(87) PCT Pub. No.: WO2021/144281
PCT Pub. Date: Jul. 22, 2021

(65) Prior Publication Data
US 2023/0048249 A1 Feb. 16, 2023

(30) Foreign Application Priority Data
Jan. 13, 2020 (EP) .................................... 20151436

(51) Int. Cl.
*C02F 1/20* (2023.01)
*C02F 3/28* (2023.01)
(Continued)

(52) U.S. Cl.
CPC ................ *C02F 1/20* (2013.01); *C02F 3/282* (2013.01); *C02F 9/00* (2013.01); *C02F 11/04* (2013.01); *C02F 11/12* (2013.01); *C02F 2209/10* (2013.01)

(58) Field of Classification Search
CPC .... C02F 1/20; C02F 3/282; C02F 9/00; C02F 11/04; C02F 11/12; C02F 2209/10; C02F 2001/007; C02F 2301/046; Y02E 50/30
(Continued)

(56) References Cited

U.S. PATENT DOCUMENTS 5,185,079 A 2/1993 Dague

FOREIGN PATENT DOCUMENTS

CN 103068747 A 4/2013
CN 104245601 A 12/2014
(Continued)

OTHER PUBLICATIONS

C. Nahle, The Contact Process for the Anaerobic Treatment of Wastewater: Technology, Design and Experiences, Wat. Sci. Tech, 1991, pp. 179-191, vol. 2, No. 8, Printed in Great Britain. (Year: 1991).*

(Continued)

*Primary Examiner* — Madeline Gonzalez
(74) *Attorney, Agent, or Firm* — Hoffmann & Baron, LLP

(57) ABSTRACT

A process for treating an aqueous fluid comprising a biodegradable organic substance the process comprising a bioreactor unit batch feeding stage, wherein the aqueous fluid that is to be treated is fed into a bioreactor unit; a batch reaction stage, wherein the aqueous fluid is microbiologically treated and biogas is produced in the bioreactor unit; a degassing unit feeding stage, wherein an aqueous suspension comprising microbiologically treated aqueous fluid and biomass is withdrawn from the bioreactor unit and fed batch-wise into (Continued)

a degassing unit; and a semi-continuous biomass separator unit feeding stage, wherein the degassed aqueous suspension is withdrawn from the batch degassing unit and fed into a biomass separator.

22 Claims, 4 Drawing Sheets

(51) Int. Cl.
  *C02F 9/00* (2023.01)
  *C02F 11/04* (2006.01)
  *C02F 11/12* (2019.01)

(58) Field of Classification Search
  USPC ................................ 210/603, 601, 605, 609
  See application file for complete search history.

(56) References Cited

FOREIGN PATENT DOCUMENTS

DE   3604415 A1   8/1987
WO   2019115034 A1   6/2019

OTHER PUBLICATIONS

XP055706043, C. Nahle, The Contact Process for the Anaerobic Treatment of Wastewater: Technology, Design and Experiences, Wat. Sci. Tech, 1991, pp. 179-191, vol. 2, No. 8, Printed in Great Britain.

* cited by examiner

SIMULTANEOUS PHASE OPERATED ANAEROBIC SEQUENTIAL BATCH REACTION SYSTEM WITH BATCH DEGASSING UNIT AND SEMI-CONTINUOUS SETTLING UNIT

This application claims priority from International Application No. PCT/EP2021/050517, filed on Jan. 13, 2021, which claims priority from European Patent Office application number EP 20151436.1, filed on Jan. 13, 2020, each of which is incorporated herein in its entirety.

TECHNICAL FIELD

The invention relates to a process for treating an aqueous fluid comprising a biodegradable organic substance, the process comprising a batch reaction stage wherein biodegradable organic substance is converted by micro-organisms, thereby forming biogas (a gas mixture generally mainly comprising methane and carbon dioxide). The invention further relates to a simultaneous phase operatable sequential batch reaction system.

DESCRIPTION OF THE PRIOR ART

A process for producing biogas from waste containing organic biomass in an Anaerobic Sequencing Batch Reactor (AnSBR) was developed in the early 1990s. U.S. Pat. No. 5,185,079 A) relates to a single vessel AnSBR operated in cycles having four main stages: Feed, Reaction, Settling and Decanting; with sludge removal when necessary. Advantages of AnSBR include a high degree of process flexibility in terms of cycle time and sequence, the possibility to operate without clarifiers are required, and the possibility to operate with relatively simple instrumentation. Furthermore, the feast/famine regime induced by sequential operation promotes the degradation of slowly degradable particulate substrates (suspended solids, oils fats and greases) and/or relatively recalcitrant compounds, as well as to an enhanced bio-flocculation. In addition, the sequential operation leads to the development of good settling sludge due to a natural selection pressure on that bad settling sludge. As a result, there an efficient solids separation is promoted, thus leading to long solids retention times (SRT) and efficient conversion of organic substrates to methane and carbon dioxide.

Despite being developed a long time ago, the industrial implementation of AnSBR have limited. The main limitations of AnSBR seems to be the misapplication of this configuration, errors in design, uncertainty on sludge settleability control as well as the challenge behind the management of batch volumes (of fluids and gases) which results in the requirement of big buffer tanks and gas storage units.

Few attempts are known to develop variations of AnSBR configuration to take advantages of the benefits mentioned above. For example a process called a "temperature-phased AnSBR" has been proposed, wherein two reactors are operated in series. The first reaction operates at a thermophilic temperature (55° C.) and the second at a mesophilic level (35° C.).

U.S. Pat. No. 5,599,450 A relates to another configuration that has been developed for the AnSBR concept is the anaerobic upflow batch reactor. This system aims to provide a plug flow through an anaerobic waste streams treatment reactor distributing waste streams evenly at bottom of reactor and collecting the waste streams at the upper level to produce upward plug flow through the reactor during filling, recycle and decanting and minimize horizontal mixing. According to the inventors such plug flow encourages growth of heavier biomass near the bottom of the reactor where substrate concentration is highest and discourages growth of light biomass near the top of the reactor where substrate concentration is lowest.

Despite various advantageous of treating an aqueous waste containing organic biomass in an AnSBR, known systems also have typical intrinsic problems. In processes such as described above, the reaction stage, during which biogas is formed from the organic biomass and the settling stage, are carried out sequentially. During settling, solids move in the direction of the bottom of the reactor, where a (concentrated) sludge forms, and in the upper part of the reactor a supernatant is formed (are fluid aqueous phase, which has a reduced solid particle content compared to the solid particle content of the fluid contents (suspension), and which is preferably essentially free of solid particles, after sufficient settling, supernatant is withdrawn from the reactor as an effluent. A long settling time is desirable for obtaining a supernatant which has a low solid particles content or is essentially free thereof, because this facilitates downstream processing of the effluent. At a given cycle time of the process, settling duration is thereby a limiting factor in the total break-down capacity of organic substances and the biogas production capacity, because it reduces the time available for the reaction phase. Further, processes carried out in an AnSBR such as described above characteristically have a fluctuating production rate of biogas. At the beginning of a process cycle (feeding stage) the biogas production rate will gradually increase until a maximum is reached (usually at or near the end of the feeding stage or at an early part of the reaction stage). After a maximum biogas production rate has been reached, the reaction stage is typically continued till the production rate reaches a lower threshold value, after which the settling stage is commenced. During the settling stage some biogas production usually still occurs, but at that stage the biogas production rate generally further decreases, to become lowest (potentially 0) during the decantation phase (wherein effluent is withdrawn). As a result of the fluctuations in biogas production rate, the biogas flow from the reaction system fluctuates significantly, which is undesired, amongst others in view of further treating the biogas stream downstream of the AnSBR and/or in providing a constant biogas supply for further use, e.g. in the production of energy.

In WO 2019/115034 an improved process and installation is disclosed, allows to simultaneously carry out the conversion of organic substance by the micro-organisms in the bioreactor and the settling of solid particles in the treated fluid in a separate container, and wherein it is possible to have a more constant flow of produced biogas exiting the installation. This process comprises (i) a bioreactor feeding stage, thereafter (ii) a batch reaction stage, wherein biogas is formed and formed biogas is temporarily stored in the separate container (2), and thereafter at least one further stage (iii) comprising a settling stage and/or an aqueous fluid effluent discharge stage, wherein the biogas stored in the separate container is used to reduce fluctuations in a biogas exit flow from the installation. This configuration has now been widely tested in industrial scale pilots and firsts full-scale systems will start to be built.

This process and installation already offer a considerable advantage, e.g. in CAPEX, OPEX, robustness or tolerance to fats in the feed. However, scaling up this process/installation adds some degree of complexity to the design of the external container, which serves both as a separator for solids (such as biomass, which comprises the micro-organisms used for forming biogas from the biodegradable substance in the bioreactor) and as a degassing unit. Big volumes need then to be handled, whereby high diameter piping and high capacity pumps are needed to feed the external container and withdraw contents from the container in a short time. For a high treating capacity one will also need a wider container and the container is pressurized during at least part of the process, which adds to the complexity of providing a flexible rooftop. The skilled person will be able to tackle this on the basis of the disclosure in WO 2019/115034 but it does add to the CAPEX. Moreover, wider-diameter means a higher footprint of the installation.

Thus there remains to be a need to provide alternative processes/installations for treating aqueous fluids, whereby/ wherein biodegradable organic substance in the fluids are converted into biogas by micro-organisms. In particular, there is a need for a simpler process or system or an even more compact process or system, more in particular a process or system which allows reducing CAPEX and/or OPEX. The present invention addresses such a need.

SUMMARY OF THE INVENTION

The inventors now found that it is possible to achieve a further improved process, whereby smaller equipment can be used (less volume of the total of bioreactor and unit(s) needed for degassing and separating of liquids for solids, such as the external container of WO 2019/115034, and/or the total area required for the installation (i.e. footprint) wherein the process is carried out whilst maintaining all the biological and physicochemical advantages achieved with WO 2019/115034 process and to keep the same capacity (or to increase capacity without needing larger equipment and/ or without needing a bigger footprint). The inventors realized in particular the advantage of the way to address these problems in an anaerobic process. However, they consider processes operated under non-anaerobic conditions may benefit from their findings too.

Accordingly, the present invention relates to a process for treating an aqueous fluid comprising a biodegradable organic substance in an installation comprising
- a bioreactor unit (1) wherein the aqueous fluid is microbiologically treated, whereby a biogas is produced from the organic substance,
- a degassing unit (2) wherein an aqueous suspension withdrawn from the bioreactor, said suspension comprising aqueous liquid, biogas and biomass, is subjected to batch degassing, and
- a semi-continuously operated biomass separator unit (3), wherein degassed suspension withdrawn from the degassing unit are subjected to separation into (a) a sludge enriched in biomass and (b) an aqueous fluid having reduced biomass content, compared to said degassed suspension fed into biomass separator unit (3), the process comprising
a bioreactor unit batch feeding stage, wherein the aqueous fluid that is to be treated is fed into the bioreactor unit;
a batch reaction stage, wherein the aqueous fluid is microbiologically treated and biogas is produced in the bioreactor unit;
a semi-continuous biomass separator unit feeding stage, wherein the degassed aqueous suspension is withdrawn from the batch degassing unit and fed into the biomass separator; and
a degassing unit feeding stage, wherein an aqueous suspension comprising microbiologically treated aqueous fluid and biomass is withdrawn from the bioreactor unit and fed batch-wise into the degassing unit.

One or more additional stages may be employed in between said stages, before the first stage and/or after the last of said stages. E.g., typically, a (further) sludge return stage follows the semi-continuous biomass separator unit feeding stage.

Usually the process comprises two or more cycles of said stages. The order of said stages is usually: first the bioreactor unit feeding stage (A), thereafter the batch reaction stage (B), thereafter the semi-continuous biomass separator stage (C), thereafter the (further) sludge return stage (D) and thereafter the degassing unit feeding stage (E).

The start-up cycle (first cycle, e.g. first time the process is run on a specific installation, or when restarting after discontinuing the process e.g. for maintenance wherein one or units have been emptied) can have said cycles in the same order, albeit that the degassing unit, if empty, may be provided with a mock-liquid i.e. any available liquid, e.g. water or effluent from another process, or even waste water or the like to be treated. In the latter case one may redirect effluent from the first cycle to the bioreactor (or buffer tank) so it can be treated in a subsequent cycle. In principle it is also possible to carry out the start-up cycle in other ways, e.g. omitting stages (C) and (D) in the first cycle.

Further, the invention relates to a simultaneous phase operatable sequential batch reaction system,
the system comprising a bioreactor unit wherein an agitator is present for agitating an aqueous suspension in the bioreactor unit for producing biogas, the installation further comprising a batch degassing unit wherein an agitator is present for agitating an aqueous suspension and configured to degas aqueous suspension that has been fed from the reaction unit into the batch degassing unit, the system further comprising a biomass semi-continuous separator unit configured to separate degassed aqueous suspension from the degassing unit into a sludge enriched in biomass and into an aqueous effluent having a reduced biomass content, compared to the degassed suspension,
wherein the separate biomass separator unit comprises
a space for holding treated aqueous suspension from the degassing chamber which spaces contains a liquid-solid separator unit, and further comprises an inlet for the degassed aqueous suspension that is connected to an outlet for treated aqueous suspension from the degassing chamber via a closable conduit, an outlet for removing the sludge and a separate outlet for removing the effluent from said separator unit via closable conduits
wherein the bioreactor unit and the degassing unit have a joint or separate head space for biogas, the headspace or headspaces comprising an outlet for biogas the system further comprising an inlet for a fluid aqueous waste stream into the bioreactor unit, a provision to feed aqueous suspension from the bioreactor unit to the degassing unit.

Such reactor system is particularly suitable for use in a process according to the invention.

In particular, good results have been achieved with a process for treating the aqueous fluid in accordance with the invention, wherein a plurality of cycles is carried out, in which cycles
the bioreactor unit batch feeding stage (A) is performed (usually as the first stage of a specific cycle), wherein the aqueous fluid that is to be treated is fed into the bioreactor unit, whilst treatment of aqueous fluid already present in the bioreactor unit may continue, the aqueous suspension in the degassing unit (fed into it in a previous stage or previous cycle) is subjected to degassing whilst use is made of mixing;

the batch reaction stage (B) is performed thereafter, wherein the batch of aqueous fluid is microbiologically treated and biogas is produced in the bioreactor unit, the aqueous suspension in the degassing unit is subjected to degassing whilst use is made of mixing;

the biomass separator unit operation stage (C) is performed thereafter, wherein degassed aqueous suspension is withdrawn continuously from the degassing unit and fed into the biomass separator at least until this one fills up to a level at which the outlet for aqueous fluid (b) having reduced biomass content is present, and from then on during this stage continuous removal of the aqueous fluid having reduced biomass content from the biomass separator takes place and the sludge (a) enriched in biomass to the bioreactor is returned continuously to the bioreactor unit, whilst microbiological treatment of the aqueous fluid in the bioreactor unit may continue;

a further sludge return stage (D) is performed thereafter, wherein feeding of degassed suspension from the degassing unit to the biomass separator has been completed, removal of the aqueous fluid having reduced biomass content from the biomass separator has stopped and sludge enriched in biomass continues to be returned to the bioreactor, whilst microbiological treatment in the bioreactor unit may continue;

the batch degassing tank fill-up stage (E) is performed thereafter, wherein once the required volume of aqueous fluid having reduced biomass content (equal to volume fed to the bioreactor during batch feed stage (A)) is withdrawn from the biomass separator unit during previous stage, the remaining sludge enriched in biomass will then continue to be returned to the bioreactor in this stage, whilst microbiological treatment in the bioreactor unit may continue.

DESCRIPTION OF THE DRAWINGS

FIG. 2A shows the bioreactor unit batch feeding stage (A);

FIG. 2B shows the batch reaction stage (B);

FIG. 2C shows the biomass separator unit operation stage (C);

FIG. 2D shows a further sludge return stage (D);

FIG. 2E shows a batch degassing tank fill-up stage (E).

DETAILED DESCRIPTION OF THE INVENTION

Figure 1:
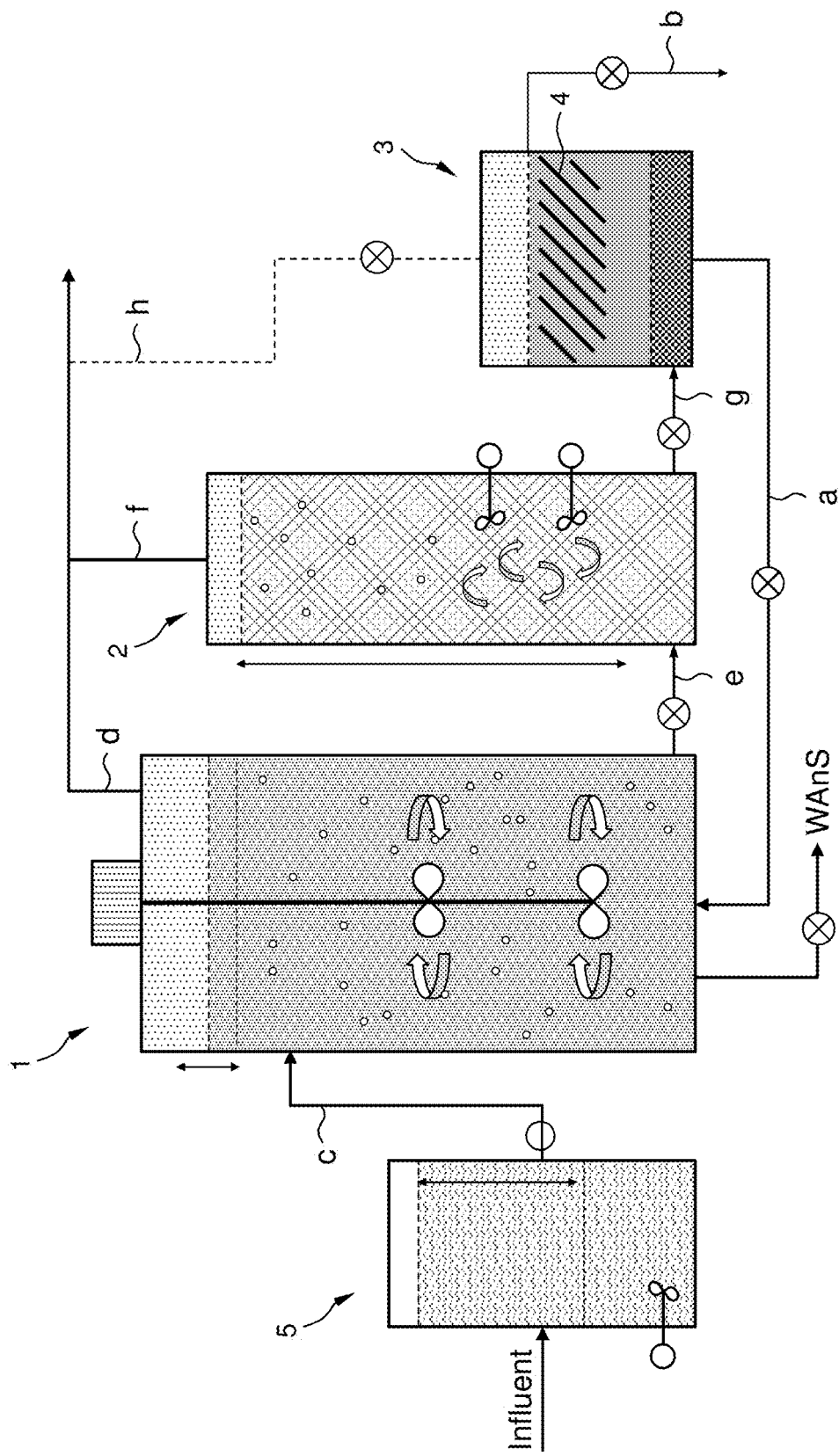
FIG. 1 schematically shows an example of a system according to the invention wherein bioreactor unit and degassing unit are separate devices.

As illustrated in Example 1, considerable savings in volume and footprint of the total reactor system are feasible. Further, it is possible to simplify the biomass separator unit (cf. the external container (2) in WO 2019/115034) wherein biomass is separated from the treated aqueous fluid. Simplification is in particular achieved in that the same separation efficiency is achievable with less separation internals for improving the separation efficiency (such as tilted lamella, which are preferably present). In accordance with the present invention, the feeding of the biomass separator, the separation of solids from the treated liquid, decanting and return of the concentrated sludge (the fraction enriched in biomass) no longer need to be carried out in individual subsequent steps (also including a degassing step). A major advantage of the present invention is that all these steps can be carried out simultaneously (in a semi-continuous way on the overall cycle) in the biomass separator. Thus the available time for all these steps can increase for the same volume of fluid to be treated, reducing the needed flow rates and consequently the pipe and pump sizing (which in turn also offers CAPEX savings). Typically, the available time for these steps is at least about 2 times longer, preferably at least about 3 times longer in particular 3-4 times longer.

Generally, the stages of the process according to the invention are repeated a plurality of times. Typically, at least after an start-up cycle, one or more subsequent process cycles of stages are performed, in which subsequent cycle or cycles the bioreactor unit feeding stage (A) is performed first, the batch reaction stage (B) is performed thereafter, the biomass separator unit feeding stage (C) is performed thereafter, then typically a further sludge return stage (D) is performed, and—as a final stage of said stages—the degassing unit feeding stage (E) is performed thereafter. Optionally there are one or more stages in between said stages or one or more stages following stage (E), after which one or more further cycles, typically in the order stage (A), followed by stage (B), followed by stage (C), (if employed) followed by stage (D), followed by stage (E) are repeated.

Generally, except for when starting-up the system from the beginning (e.g. on first use or after maintenance), the reactor generally already contains the biogas producing microorganisms. Once the microorganisms have been provided into the reactor, they generally don't need to be introduced into the reactor anymore during subsequent cycles of the process.

An installation according to the invention is particularly suitable for use in the microbiological treatment of an aqueous fluid comprising a biodegradable organic substance whereby biogas is formed from said biodegradable substance, preferably in a process according to the invention.

It is a major advantage of the present invention that it allows to simultaneously carry out the conversion of organic substance by the micro-organisms in the bioreactor, whilst a batch of the aqueous fluid that already been subjected to the treatment in the bioreactor is subjected to degassing in the degassing unit and—after degassing—to the biomass separation treatment in the biomass separator.

The aqueous fluid treated in a process according to the invention can in principle be any aqueous fluid that comprises an organic substance that is biodegradable, in particular under anaerobic conditions. Preferably, the aqueous fluid is selected from the group of municipal waste water, industrial waste water (e.g. from chemical industry or food-processing industry), agricultural waste water, sewage water, aqueous fluid waste from fermentation processes (such as residual fermentation broth, waste water from brewing processes, waste water from wine making processes). Further preferred are aqueous slurries and aqueous sludges. Said slurries may originate from the same sources as mentioned for the waste water. In terms of water content of a waste stream treated in a process according to the invention, this may vary in a wide range. Generally, the water content of the aqueous fluid to be treated is more than 80 wt. %, in particular at least 80 wt. %, more in particular 90 wt. % or more of the total weight of the fluid. Usually, the water content is 99.9 wt. % or less, preferably 99.5 wt. % or less, more preferably 99 wt. % or less, in particular 98 wt. % or less, more in particular 96 wt. % or less. The total organic substance content of the aqueous fluid to be treated is usually 0.1 g COD/l or more, preferably in the range of 0.3-100 g COD/l, more preferably in the range of 1.0-50 g COD/l, in particular in the range of 5-50 g COD/l, more in particular in the range of 8-50 g COD/l. In a specific embodiment the total organic substance content is in the range of 1.0-30 g COD/l, more specifically in the range of or in the range of 5-15 g/l. In accordance with the invention it is possible to substantially reduce the total organic substance content, usually for more than 50%, preferably for between 70% and 100%, more preferably for 75-99%, more preferably for 80-97%. The process of the invention also provides an effluent with a low TSS (total suspended solids) in the aqueous effluent; typically the aqueous effluent from the biomass separator (3) comprises less than 1.5 g/l TSS, in particular 1.0 g/l or less, preferably about 0.6 g/l or less. Usually, the TSS content the aqueous effluent from the biomass separator (3) is about 0.2 g/l or more, in particular about 0.3 g/l or more, more in particular about 0.4 g/l or more. In practice, operating at a TSS content of the effluent in the range of about 0.4 g/l to about 0.6 g/l is preferred. Further downstream TSS content may be further reduced in a manner known per se, e.g. by filtration.

A process according to the invention is also particularly suitable to treat waste streams with a relatively high content of fat, oil and/or grease (FOG) and/or a relatively high content of suspended solids. TSS is the solid fraction of the fluid that is obtainable by filtering a known weight or volume of the fluid using a 1.6 µm filter (dead end filtration), taking the retentate, washing the retentate with distilled water, drying the washed retentate, and determining the residual dry weight. The TSS may thus include inorganic substance in addition to organic substance. To distinguish the organic substance from the inorganic substance, the sample is burned at 550° C., all the organic substances are burned and the sample residual consist in inorganics. The burning test is usually a practical alternative to the COD test. Usually the TSS content of the fluid waste is in the range of 0-20 g/l. The FOG content is usually in the range of 0-4 g/l. In particular, a process according to the invention (operated under conditions wherein the solids in the bioreactor are at least substantially flocculent) is also advantageous—e.g. compared to conventional processes operated under conditions wherein the solids in the bioreactor are at least substantially granular—for treating a fluid waste having a TSS content of 0.5 g/l or more, in particular 1.0 g/l or more, preferably of 1.5-30 g/l, more preferably 2.0-20 g/l and/or a FOG content of 50 mg/l or more, in particular 0.1-4 g/l, more in particular 0.1-2 g/l. One such advantage is a more efficient conversion of suspended solids by the micro-organisms. A second advantage, especially at a high content of FOG, is a reduced tendency or complete avoidance of flotation of solids (including micro-organisms), typically caused by a high FOG content in granular systems, which may result in the wash-out of micro-organisms.

Examples of aqueous fluids which are particularly suitable to be treated in accordance with the invention are aqueous wastes from a dairy food production or processing (e.g. the production/processing of milk, cheese, butter), a beverage production or processing (e.g. wine, beer, distilled beverage, fruit juice, milk), a biofuel production or processing, a chemical plant or an aqueous waste from an agricultural facility.

The skilled person will know how to determine a suitable liquid content, solids content and micro-organism content in the bioreactor, based on common general knowledge, the information disclosed herein and the citations mentioned herein.

The system (used in a process) according to the invention, comprises several units, i.e. at least the bioreactor unit, the degassing unit and the biomass separator unit. During use, the units perform a unit operation, such as a microbiological conversion of organic substance, whereby biogas is produced in the bioreactor unit, degassing in the degassing unit and separation into a concentrated sludge and a clarified aqueous fluid in the separator unit. In chemical engineering and related fields, a unit operation is a basic step in a process. Unit operations involve a physical change or chemical transformation. Thus a unit can be a piece of equipment configured to carry out a unit operation, or a unit can be a compartment of a piece of equipment comprising several compartments (units), each wherein a separate unit operation is carried out, i.e. the bioreactor unit and the degassing units can be (spaced apart) different pieces of equipment, or they can both form separate parts of a single (integrated) piece of equipment, such as a vessel with an inner compartment for carrying out the microbiological treatment and an outer compartment for degassing.

The bioreactor unit in a system or process according to the invention is typically a bioreactor configured for operating under anaerobic conditions (gas-tight; usually at 2-50 mbar above atmospheric pressure).

The bioreactor can be based on known systems for batch-wise microbiological treatment of aqueous fluids. The bioreactor typically comprises an agitator for agitating the aqueous fluid in the bioreactor, such as one or more stirrers. Preferably the bioreactor is configured to be operated with a flocculent biomass (comprising the micro-organisms that degrade organic substance into biogas).

The degassing unit in a system according to the invention is usually also an agitated system, such as a stirred system, configured for operating under anaerobic conditions (gas-tight at 2-50 mbar above atmospheric pressure, usually). Generally, the headspace is connected to the bioreactor headspace to allow for biogas transfer from one to the other when transferring content form/to the bioreactor. Preferably a plurality of agitators, in particular stirrers, is present at different heights in the degassing unit. The agitator is respectively agitators are preferably positioned to cause a circulation of fluids in an essentially vertical direction. Thus, stirrers are preferably provided such that they can rotate around an essentially horizontal axis. The present invention allows the use of a relatively slim and tall degassing tank, compared to, e.g, the external container of WO 2019/115034. For savings in footprint, usually the degassing unit has a height of about 3 m or more, preferably about 5 m or more. A relatively tall degassing unit is efficiently possible because there is no need for settling in the degassing unit (for settling a relatively shallow unit is advantageous, as is the case in the external container of WO 2019/115034), thereby allowing a smaller diameter in the horizontal direction, and saving footprint. Usually the height is about 10 m or less, in particular 6-8 m. The internal space (volume) of the bioreactor (1) for holding the fluid to be treated microbiologically plus the headspace is usually about 1.5 to about 10 times, preferably about 2 to about 6—times, in particular 3-5 times the internal space (volume) for holding a fluid suspension to be subjected to degassing plus the headspace of the degassing unit.

The degassing unit is a separate unit from the biomass separator Alike the external container of WO 2019/115034, it can also serve as a biogas storage unit, but is not compulsory. Its roof top is usually of a rigid material, i.e. not deforming, inflating or deflating due to (biogas) pressure changes in the headspace; it can be the same or similar in material properties (such as stiffness, mechanical strength) to the side wall or walls. The degassing unit can be opened during a process according to the invention, e.g. for maintenance, at a stage in the process wherein it is not used for biomass separation. In such case, the gas-connection between the headspaces of the bioreactor and the degassing units will generally be shut. It is typically operated as a continuous flow through the settler, during the settling/decanting phase; i.e. overall it is typically used in a semi-continuous matter.

The biomass separator unit, such as a biomass settler tank, is usually a system having tilted internals, such as tilted plates, internals configured to enhance the settle-ability of solid particles in the aqueous fluid (such as a suspension or sludge). The tilted internals can e.g. by tilted tubes or tiled plates, which can be flat or corrugated. The tilted internals are usually placed in an angle of about 55 to about 60°. They are usually placed at least about 2 to about 10 cm distance from each other to enhance separation and avoid clogging of the separator. Such tilted internals further promote the separation of remaining biogas (if any) from the liquid and solid phases.

The tilted internals (4) of the biomass separator unit (3), preferably lamellae, usually occupy a part of the working volume of the biomass separator unit (3) in the range of about ¼ to about ⅔, preferably in the range of about ⅓ to about ½ of the working volume of the biomass separator. In an upper part or above the space occupied by the internals the outlet for the effluent 'b' is generally provided. Below the internals generally a space is provided for the concentrated sludge. Above the internals usually a headspace is present Particularly good results have been achieved with a system wherein the tilted internals are lamella and are between ½ and ⅓ of the working volume of a Semi continuous settler tank (3).

The suspension treated in the biomass separator has already been subjected to good degassing in the degassing tank, enabling good settling. Due to the semi-continuous operation of the biomass separator unit (with simultaneous sludge return, fill-up and decanting) and the consequent lower flow-rates the area required for settling is much lower and thus the space/area taken by the internals can be relatively low, as it generally suffices if they are effective in allowing solids (comprising biomass) to settle, whereby (a) the concentrated sludge is continuously being returned to the bioreactor reducing the overall solids concentration in the biomass separator allowing for faster separation of the solids due to a reduced solids gradient and (b) the aqueous fluid having reduced biomass content (effluent from the separator) are formed and also leaves the system in a semi-continuous way.

Further considering that the total volume of the system can be considerably smaller for a same treatment capacity, savings on volume take by separation internals (e.g. lamella) can be more than 50%, e.g. about 75%.

Next the process and system according to the invention are further described with reference to FIGS. 1-4.

The bioreactor (1) comprises an inlet for aqueous fluid, preferably in an upper part of the bioreactor. The inlet is usually fluidly connected via a conduit (c) to a buffer tank (5). The buffer tank buffers for fluctuations in the rate of the fluid to be treated (typically a waste stream). Also it allows to temporarily store fluid fed into the system (influent) before a next bioreactor feeding cycle starts (as will be further described below). Usually, the buffer tank 95) contains an agitator, such as a stirrer, to keep the contents relatively homogeneous (e.g. solids suspended). It may also comprise means to add additives, e.g. nutrient for the micro-organisms or pH-regulating additives (acid/base/buffer).

Figure 2:
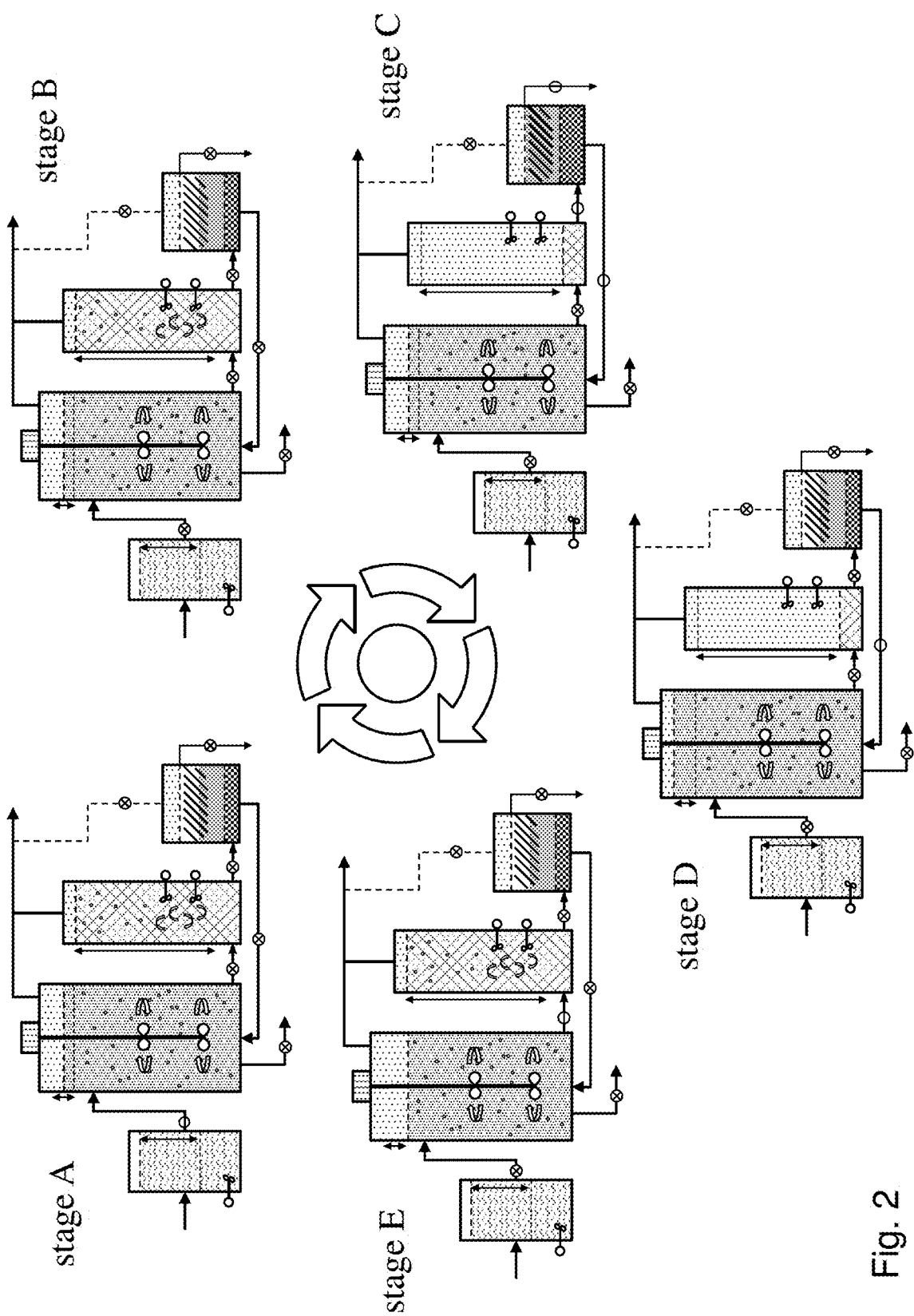
FIG. 2 schematically shows a process according to the invention, using a system according to FIG. 1. Herein.

The bioreactor (1) has an outlet for biogas (d), provided in the headspace of the bioreactor. The bioreactor does require to have separator internals for degassification. It typically is a stirred bioreactor, so it contains one or more stirrers, although other types of agitation means can be provided. It further has an inlet for recycling concentrated sludge from the biomass separator, which inlet in fluidly connected via a conduit (a) with an outlet for the sludge in the biomass separator unit (3). Said inlet respectively outlet are usually provided in a lower part of the bioreactor respectively biomass separator unit. The bioreactor (1), conduit (a) or the biomass separator (3) typically have a drain for concentrated sludge (WAnS in FIGS. 1 and 3). Preferably said drain is provided in the bioreactor, typically in or near the bottom thereof. Further the bioreactor (1) comprises an outlet for an aqueous suspension (comprising the treated aqueous fluid and biomass) which is fluidly connected to an inlet of the degassing unit (2) via a conduit (e). In an embodiment, the outlet for the aqueous suspension of the bioreactor is in a lower part of the reactor. This allows at least substantially complete withdrawal from the bioreactor in the degassing unit. Such embodiment is illustrated in FIGS. 1 and 2. FIGS. 1 and 2 also show an embodiment wherein the bioreactor unit (1) and the degassing unit (2) are spaced apart.

Figure 3:
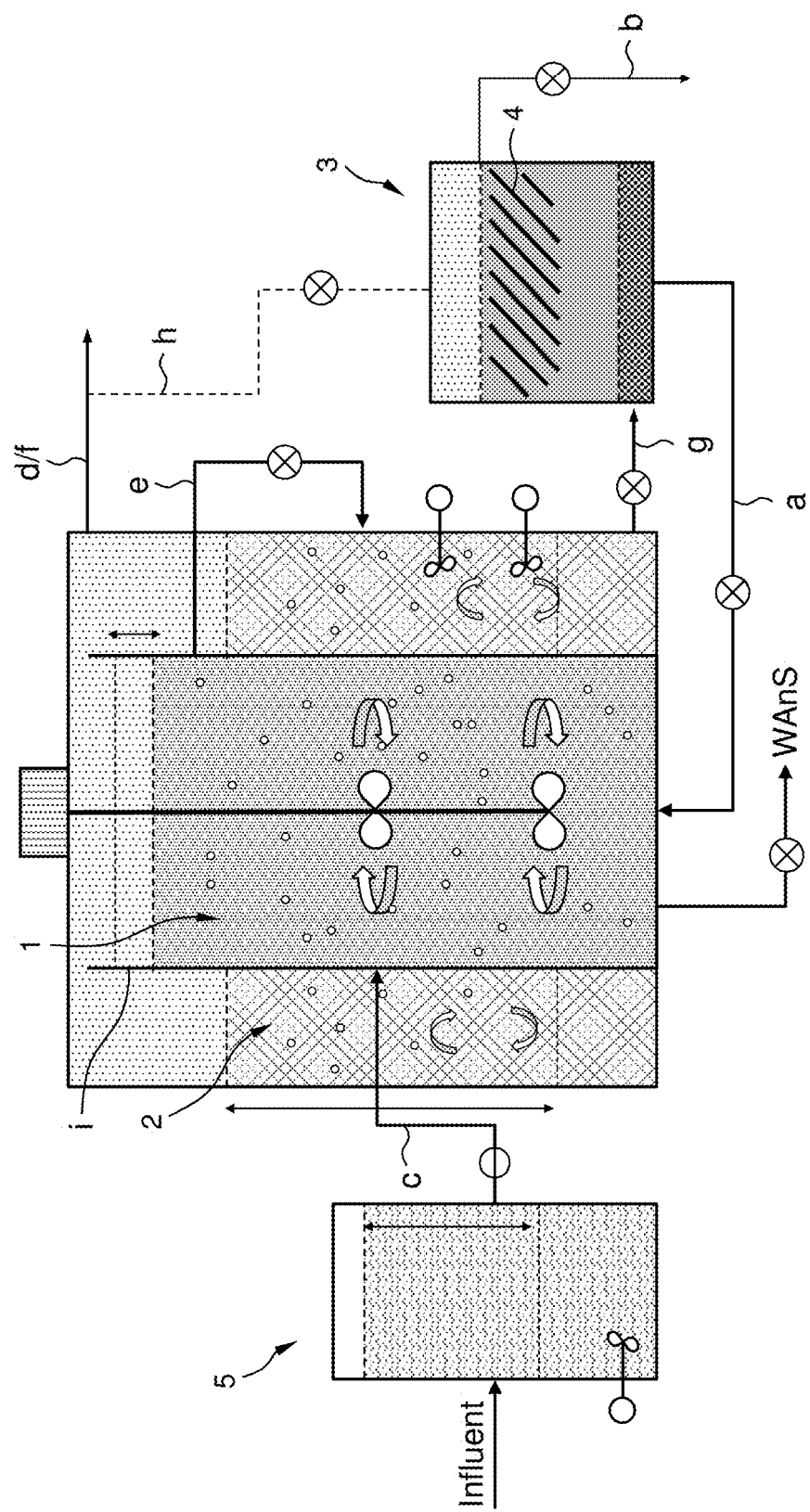
FIG. 3 schematically shows an example of a system according to the invention wherein bioreactor unit and degassing unit are integrated in the same housing.
Figure 4:
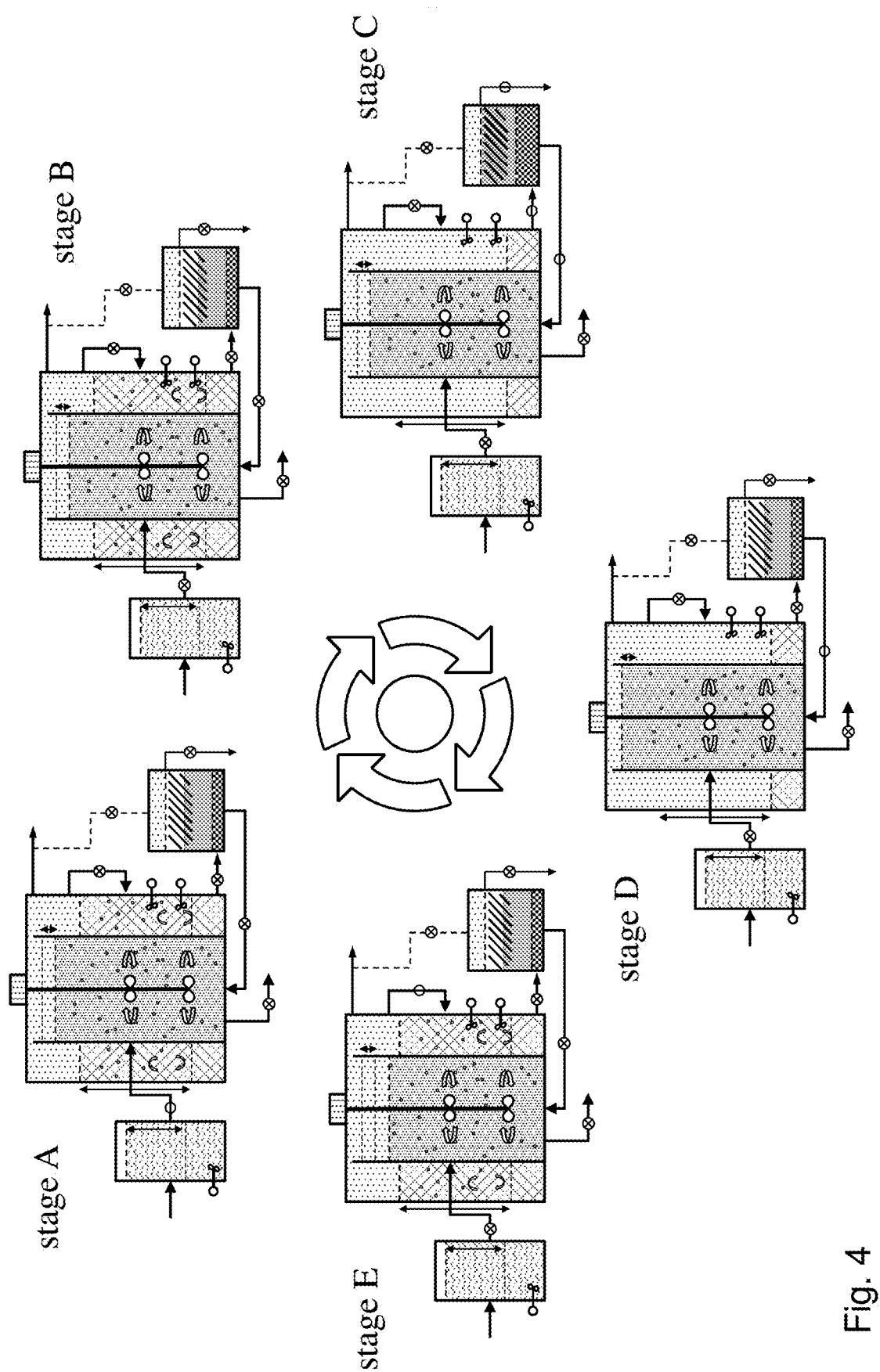
FIGS. 4A-4E schematically show a process according to the invention, using a system according to FIG. 3, analogously to FIGS. 2A till 2E.

In another embodiment (e.g. as illustrated in FIGS. 3 and 4) the outlet is positioned in a middle or higher part of the bioreactor, higher than the inlet for aqueous suspension into the degassing unit. This allows to make use—at least partially—of gravitational flow to withdraw the suspension from the bioreactor (1) and feed it into the degassing unit (2). The degassing unit is typically a stirred-type of degassification unit. It does not require separator internals. An outlet for biogas (f) is provided in the headspace of the degassing unit (2). A conduit (g) connects an outlet for degassed aqueous suspension provided in degassing unit (2) with an inlet for degassed aqueous suspension into the biomass separator (3). Said outlet from degassing unit (2) is typically provided at or near the bottom of the degassing unit, to allow essentially complete removal of degassed suspension. The position of the inlet into the biomass separator unit depends on the type of separator. Particularly preferred is a biomass separator having separator internals (4) in a middle or upper part of the biomass separator, wherein the inlet for degassed suspension is provided at or below the lowest level of the separator internals and wherein the outlet (b) for effluent is positioned at a higher altitude, preferably at, near or above the highest level of the separator internals whereby—during at least part of the separation stage, an upward liquid flow is provided through the internals, whilst there is a net-downward motion of solids, such as biomass, and a reduction in solids content at the outlet (b) for effluent is accomplished. This design allows the semi-continuous use of the biomass separator, during which feeding of aqueous suspension and withdrawal of (b) effluent plus optionally withdrawal of (a) sludge from the biomass separator takes place. Optionally a biogas outlet (h) is provided in the headspace of the biomass separator, typically in the roof top or near the roof top (above the effluent outlet(b)).

As shown in FIGS. 3 and 4, the bioreactor unit (1) and the degassing unit (2) can be integrated in a single housing. Thus, they can form part of a single tank/vessel. The bioreactor unit and the degassing units still are separate compartments though, whereby unintentional mix-up of contents is avoided. Thus, the aqueous suspension in the bioreactor unit and the aqueous suspension in the degassing unit are separated by an aqueous fluid-impermeable partitioning (i). Headspaces can be shared though. This design allows a further reduction of footprint of the system. From a horizontal perspective, the bioreactor typically forms an inner part in the single housing, whereas the degassing unit forms an outer part (essentially surrounding the bioreactor). The ratio behind this is the need for a smaller internal volume of the degassing unit than for the bioreactor. Having the larger volume at the inner part, reduces strength requirements of the materials used for the system. If the bioreactor is on the outer part, the forces applied to the portioning will be much bigger when the bioreactor is full and the degassing unit is empty, introducing the risk of collapse if the partitioning is not strong enough.

Particularly preferred is such an integrated at least substantially cylindrical vessel, wherein the bioreactor (1) forms an inner at least substantially cylindrical vessel and wherein the bioreactor is at least substantially surrounded by the degassing unit (2).

A process according to the invention comprises at least four stages, as indicated above. Herein below, when it is mentioned that a conduit is closed, this can refer to a valve having been shut to prevent a flow, but also to a pump that is not pumping. I.e. it means that no flow takes place in the conduit.

During (A) the bioreactor unit batch feeding stage, the aqueous fluid that is to be treated is fed into the bioreactor unit. The aqueous fluid is usually fed into the bioreactor (1) via a conduit (c) which is fluidly connected to an outlet of a buffer tank (5). The fluid can be fed at any point in the reactor. During this stage, the conduit (e) between bioreactor (1) and degassing unit (2) is usually closed to avoid freshly fed fluid to be treated to the degassing unit, although in principle it could be open. It should be noted that the micro-organisms can already convert biodegradable substance, whilst feeding takes place (fed-batch). After the first cycle, contents of the degassing unit are subjected to degassing during this stage as well. Thus, the conduit (g) between the degassing unit and the biomass separator (3) is also typically closed. Usually, recycle of sludge (a) from a previous will already have been completed. Thus, conduit (a) can also be closed. Usually, removal of effluent (b) from a previous will already have been completed. Thus, conduit (b) can also be closed.

After, the bioreactor batch feeding stage (A) the batch reaction stage (B) follows. During this stage, there is typically neither a feed into the bioreactor nor withdrawal of treated suspension, i.e. conduits (c) and (e) are closed. Degassing in degassing unit (2) is allowed to continue (after the first—start up—cycle). Thus, conduit (g) is generally also still closed, although one may in principle start withdrawing degassed suspension from the degassing unit (2) into the biomass separator unit (3) if degassing has been carried out to a sufficient extent before the microbiological treatment in bioreactor (1) has proceeded sufficiently. The separator usually still remains at rest in this stage. The volume of aqueous suspension in the bioreactor (1) wherein the microbiological treatment of the aqueous fluid takes place per batch (per cycle), is generally the same or larger than the volume of the aqueous suspension subjected to degassing in the degassing unit (2) per batch (cycle). Generally said volume in the bioreactor (1) is less than 10 times than said volume in the degassing unit (2) Preferably, said volume in the bioreactor (1) is about 1.5 to about 4 times said volume in the degassing unit, more preferably about 2 to about 3 times, said volume in the degassing unit. A relatively high volume of the bioreactor is advantageous for reducing footprint of the used installation.

During the semi-continuous biomass separator unit feeding stage (C)—which follows stage (B), at least after the start-up cycle, the microbiological treatment in the bioreactor (1) generally continues (albeit that the biogas production rate will decline during this stage. In this stage, degassed contents of the degassing unit are pumped into the biomass separator via conduit (g). Thus, the degassing unit is generally at least substantially emptied; typically 90-100% of the degassed suspension is fed into the biomass separator (3). As the separator fills up, a separation into concentrated sludge (a) and aqueous fluid with reduced solids content will form; both concentrated sludge (a) and aqueous fluid (b) can be withdrawn from the separator already whilst feeding of the separator continues. At the start of this stage, the biomass separator unit will usually be essentially empty. At least, the fluid level will be below the outlet for the clarified aqueous liquid (b) The outlet for clarified aqueous liquid is generally above the outlet for concentrated sludge (the outlet for the sludge typically being at or near the bottom), typically above the inlet level for the degassed aqueous suspension, and typically at or above the upper level of separator internals. Thus, in this stage continuous feeding to the separator unit will generally take place to fill the separator unit to reach a fluid level at the height of the outlet for the clarified aqueous liquid, and then withdrawal of sludge (a) and fluid (b, effluent) from the separator will take place. Accordingly, in this stage feeding, separating and withdrawal of sludge (a) and clarified aqueous liquid (b) are advantageously performed semi-continuously (i.e. an initial phase with feeding yet no withdrawal of clarified liquid followed by the continuous phase wherein feeding and withdrawal take place continuously), although in principle it is also possible to feed suspension to be separated and withdraw sludge (a) and clarified aqueous fluid (b) intermittently. Withdrawal of the clarified liquid (b) can usually be done simply by gravity overflow, without the need of a pump. The concentrated sludge (a) recycle to the bioreactor unit usually requires the use of a pump.

Solid particles other than the biomass, which may be present in the aqueous fluid, e.g. mineral particles, will also preferentially end up in the concentrated sludge, thus, the clarified aqueous fluid will have not only a reduced biomass content but also a reduced total solids content.

Preferably, concentrated sludge (a) enriched in biomass is recycled to the bioreactor unit and clarified aqueous fluid (b) having reduced biomass content is removed from the biomass separator unit and discarded as effluent or subjected to further downstream processing. The sludge (a) is returned to the bioreactor (1) via conduit (a). Recycle of the sludge (a) and removal of clarified aqueous fluid (b) typically take place during the biomass separator unit feeding stage (C), but can also be take place thereafter, yet before the start of the next of said stages (E) or (A). As a rule of thumb, the clarified aqueous fluid (b) will form 20-45 vol %, in particular 25-40 vol %, more in particular 30-35 vol % of the degassed suspension separated in the biomass separator, whereas the concentrated sludge (a) will form the remainder. Thus, when recycled, the sludge enriched in biomass (a) will form 55-80 vol %, in particular 60-75 vol %, more in particular 65-70 vol % of the total of said sludge (a) plus the aqueous fluid (b) having reduced biomass content.

If a surplus of biomass has formed, a part of the sludge can be discarded. Aqueous fluid (b) is withdrawn from the system (effluent) and can be discarded as such, or be subjected to further downstream treatment (not shown). Suitable downstream treatment processes are generally known in the art.

Usually essentially all of the degassed contents of the degassing unit is transferred to the biomass separator unit. A small liquid level can be left at the bottom, e.g. about 10-25 cm. When complete emptying of the degassing unit is to be performed, one would generally need to use a lining in the floor of the degassing unit. Once all the degassed suspension that is to be fed into the separation unit (2) in this cycle (, conduit (g) can be closed. Preferably withdrawal of contents from the biomass separator is continued until the separator is at least substantially emptied. In this stage ('D', illustrated in FIGS. 2D, and 4E), typically sludge (b) is recycled to the biomass separator via conduit (a). Withdrawal of effluent will typically be discontinued when feeding of the biomass separator stops, or shortly after the beginning of this stage. In principle, it is possible to start filling the degassing unit (2) with contents of bioreactor (2) via conduit (e) in this stage.

However usually, filling of the degassing unit is started in a separate stage (E), or at least continued during this stage, as illustrated in FIG. 2E and FIG. 4E.

Stage (E) is the degassing unit feeding stage, wherein an aqueous suspension comprising microbiologically treated aqueous fluid and biomass is withdrawn from the bioreactor unit and fed batch-wise into the degassing unit. Thus, conduit (e) is open, whilst the other conduit can remain closed.

Once the bioreactor (1) has been sufficiently emptied by feeding contents thereof to the degassing unit (2), the next cycle can start: the bioreactor is fed again with aqueous fluid to be treated in the bioreactor, etc, followed subsequently by stage (B), (C), (D) and (E).

A process according to the invention is especially advantageous for anaerobic treatment, wherein biogas is formed from the biodegradable organic substance. Usually anaerobic conditions are maintained not only in the bioreactor but also in the degassing unit, whereas the biomass separator unit can be operated under anaerobic conditions, but need not maintained. E.g. it can be opened regularly for maintenance or cleaning, whilst the bioreactor and/or degassing unit are being used, e.g. during (A) the bioreactor feeding stage, (B) the batch reaction stage and/or (E) the degassing unit feeding stage. The pressure in the headspace can be atmospheric (0 barg). Preferably, though, anaerobic conditions are maintained whilst there is (small) superatmospheric pressure in the headspace of the bioreactor and degassing unit, such as a pressure of up to 100 mbarg, in particular 5-70 m mbarg ideally under a pressure of 0-70 mbarg.

The design of an installation (used in a process) according to the invention is also advantageous in that the headspace of the bioreactor (1), (i.e. the upper part inside the reactor above the fluid phase, wherein biogas is present) is connected via a channel with headspace of the degassing unit. Hereby a gas-tight system is provided, whereby the substantial risk of odors and biogas emissions, a recurrent issue, especially in anaerobic contact reactors, is eliminated. Optionally also a biogas connection is provided with the separator (3)

A process according to the invention allows convenient real-time system monitoring, optimization and phase automatization based on sequential biogas production profiles (biogas production rate as function of time). System capacity can be monitored real-time by following the biogas production in each profile.

In a process or installation according the invention the system load and reaction/settling phase duration can be adjusted and optimized based on a "standard" biogas profile, i.e. a benchmark/reference biogas profile as defined by an operator for a specific process of interest. The biogas profile allows to link feed and sequence to biogas production, contributing to an efficient controlling and avoiding any potential overload of the system. In known continuously operated processes it is not possible to have a biogas profile that can be adequately used for that purpose. This use of a biogas profile is a major advantage over processes that are continuously operated, such as treatment in an anaerobic membrane reactor (AnMBR), in a continuous stirred tank reactor with a dissolved biogas flotation unit (DBF) or in an in contact process as described in the early 1990's by Nähle, in Wat. Sci Tech. Vol 24, No 8, 00 179-191 (1991). A continuous process, e.g. as described by Nähle, is in particular prone to TSS and/or FOG overloads in the bioreactor or effluent. This is due to a lack of targeted degradation of TSS and FOG in continuously operated systems, like the one described by Nähle. After all, in continuous processing, fresh substrate (biodegradable substances) for the biomass is continuously fed to the biomass. Waste streams are usually relatively inhomogeneous streams, containing several different degradable components, in terms of chemical composition and/or physical state (dissolved/suspended, small particles/large particles). This means in general that both relatively easily degradable feed components (such as digestible soluble/dissolved components) and difficult to degrade feed components (such as suspended solids, FOG) are continuously introduced in the bioreactor containing the biomass, thereby offering continuously relatively easy to degrade substrate for the microorganisms (biomass). Thus, easy to degrade substrate is generally abundant in continuous operation. Microorganisms generally have a preference for easy to degrade components. As a result, continuous operation is vulnerable to accumulation of components that are relatively difficult to degrade (such as suspended solids, FOG), until there is so much present that biomass floats and results in an undesirable, or even unacceptable, loss of biomass and/or non-degraded organic substances via the effluent. The present invention allows a feast/famine regime created by batch operation in the bioreactor that targets to force biomass to degrade the fats and solids before the biomass is fed again. This is combined in the present invention with proper degassing of biomass to settle. Thus, by measures described in the present disclosure the inventors have in particular realised an efficient way to carry out a process according to the invention, including an efficient operation of a batch stage in the process, also when treating an aqueous fluid, such as waste water, having a relatively high content of TSS and/or FOG. Hereby an important biological performance advantage is achieved over essentially fully continuous processes. This is in particular achievable by one or more of the following measures:

Simultaneous Reaction/Settling phase—This enables much longer settling periods (usually at least about 2 times longer than in a conventional AnSBR) without compromising the duration of the reaction phase, something not feasible to achieve in an conventional AnSBR.

Simultaneous Feed/Withdrawal phase—This system can also achieve simultaneous feed and withdrawal (decanting) phase, reducing the number of phases required per cycle, something not feasible to achieve in a conventional AnSBR.

Reduction in tilted internal (lamella) volume/area required; a reduction of up to about ⅔ the required lamella volume/area is usually feasible whilst maintaining essentially the same separation efficiency No pressurised internals in the degassing tank needed. This offer simplification, increased safety, easier construction execution and easier maintenance of tilted internals (such as the lamellas) in the biomass separator in case of blockage.

Optimised biomass separation: Semi-continuous biomass separation in a separate unit after a (batch degassing) enables for much longer decanting and sludge return times which in turn result in much smaller pipe diameters as well as lower requirements for pumping.

Reduction in footprint—The Batch degassing tank despite needing at least 2 times the batch size there is no height restriction in this new improvement; which means that this tank can be a slim and tall tank (preferably about 6-8 m height), which uses less footprint. Furthermore, the current invention enables a compact configuration by integrating the Batch Degassing tank within the reactor tank that will be a further optimisation and reduction in footprint.

Extended degassing times without affecting the cycle length.

The term "or" as used herein is defined as "and/or" unless specified otherwise.

The term "a" or "an" as used herein is defined as "at least one" unless specified otherwise.

When referring to a noun (e.g. a compound, an additive, etc.) in the singular, the plural is meant to be included.

The term "(at least) substantial(ly)" is generally used herein to indicate that it has the general character or function of that which is specified. When referring to a quantifiable feature, this term is in particular used to indicate that it is at least 50%, more in particular more than 75%, even more in particular more than 90% of the maximum that feature. The term 'essentially free' is generally used herein to indicate that a substance is not present (below the detection limit achievable with analytical technology as available on the effective filing date) or present in such a low amount that it does not significantly affect the property of the product that is essentially free of said substance. In practice, in quantitative terms, a product is usually considered essentially free of a substance, if the content of the substance is 0-1 wt. %, in particular 0-0.5 wt. %, more in particular 0-0.1 wt. %.

In the context of this application, the term "about" means generally a deviation of 15% or less from the given value, in particular a deviation of 10% or less, more in particular a deviation of 5% or less.

As used herein "biodegradable organic substance" is organic substance that can be converted by biomass in the reactor, typically under essentially anaerobic conditions, in particular into biomass or methane.

The term "fluid" is used herein for liquids and mixtures of liquids and at least one other phase, such as suspensions, that flow without applying external pressure (pressure other than gravity).

As used herein "organic substance" is any organic substance that is chemically oxidisable, as can be determined by the Chemical Oxygen Demand (COD) test, as described in ISO 6060:1989. A content of organic substance is generally expressed in g COD, i.e. grams oxygen that is consumed for the oxidation of the organic substance.

The skilled person is familiar with terms like 'upper', 'lower', 'middle', 'at bottom', 'near bottom', 'at top' and 'near top'. Generally these are read in relation to another, and the skilled person will be able to reduce implementation thereof to practice, based on common general knowledge, the information and citation disclosed herein, and the specifics of a unit (such as bioreactor, a separate container, or a volume of matter contained in the bioreactor or a section) of the installation.

As a rule of thumb, unless follows differently from the context, 'near' a certain reference point (such as 'bottom' or 'top') usually means 'at a relative height of up to +/−20%' from the reference point', in particular s 'at a relative height of up to +/−15%' from the reference point' more in particular 'at a relative height of up to +/−10%' from the reference point. The relative height is the distance from the bottom divided between the total height of the unit (height difference between bottom and top).

As a rule of thumb, unless follows differently from the context, an 'upper' part generally means in the upper ½, and in particular in the upper ⅓ of the unit, a 'lower' part generally means the lower ½ of the unit and in particular the lower ⅓ of the unit. When referring to a middle part, this in particular means the middle ⅓ of the unit (from ⅓ of the bottom to ⅓ from the top).

For the purpose of clarity and a concise description features are described herein as part of the same or separate embodiments, however, it will be appreciated that the scope of the invention may include embodiments having combinations of all or some of the features described. Terms used herein that are not specifically defined herein are as defined in WO 2013/139823 or WO 2019/115034, or—if not defined therein—used in accordance with common general knowledge.

The invention will now be illustrated by the following examples.

Example 1

Case Study, Comparison WO 2019/115034

A case study was performed to exemplify in a quantifiable way the advantages a process according to the invention compared to WO 2019/115034. The case study was based on the following Feed flow & composition.

| Feed flow & composition | | |
|---|---|---|
| Design flow rate | 780 | m3/d |
|  | 33 | m3/h |
| Parameter | kg/d | mg/l |
| Total COD | 6,143 | 7,875 |
| Particulate COD | 3,834 | 4,915 |
| Soluble COD | 2,309 | 2,960 |
| VFA-COD | 780 | 1,000 |
| TSS | 2,196 | 2,815 |
| VSS | 2,130 | 2,731 |

Legend:
COD=chemical oxygen demand

VFA-COD=COD formed by volatile fatty acids
TSS=total suspended solids
VSS=volatile suspended solids The following parameter requirements and savings were calculated

| Parameter | | WO 2019/115034 | Present invention | Savings |
|---|---|---|---|---|
| Total volume required | m3 | 1008 | 632 | 37% |
| Total area required (footprint) | m2 | 265 | 143 | 46% |
| Lamella requirement | m3 | 280 | 70 | 75% |
| Max batch transfer flow rate | m3/h | 1050 | 1050 | 0% |
| Max return sludge flow rate | m3/h | 186 | 79 | 58% |
| Effluent discharge rate | m3/h | 420 | 53 | 88% |

Example 2

Industrial Scale Validation, Comparison WO 2019/115034

A waste water stream of a winery&distillery was first subjected to treatment in accordance with WO 2019/115034 for about 60 days. Thereafter a change into the process according to the invention was made.

The feed and system conditions were as follows:

| PARAMETER | RANGE | AVERAGE |
|---|---|---|
| Total COD (g/L) | 1.5-12.6 | 6.7 |
| SCOD (g/L) | 1.1-12.2 | 6.4 |
| TSS (g/L) | 1.0-2.4 | 1.6 |
| FOG (g/l) | up to 4 | n.a. |
| Particulate COD | 1-41% | 15% |
| Reactor Volume | 610-780 L | |
| Temperature | 36° C. | |

It was found possible to maintain essentially the same performance in terms of TCOD, SCOD (soluble COD), VLR (Volumetric Loading Rate, expressed as kg COD/$m^3$ day), SRT (Solids Retention Time, expressed in days) and MLSS (mixed liquor suspended solids, expressed as g/L), after change into the process of the invention. Performance maintained as indicated in the following table, considering that for the new configuration the degassing tank and semi-continuous settler were both operated at operational parameters, cycle times and flow rates required for full-scale.

| Performance | Range | Average |
|---|---|---|
| TCOD removal (%) | 82-97 | 94 |
| SCOD removal | 98-99 | 99 |
| VLR (g COD/L day) | 1.6-5.3 | 4.0 |
| SRT (days) | 39-71 | 46 |
| MLSS (g/L) | 7.1-13.1 | 10.8 |

Thus, it was concluded that the process according to the present invention is a good alternative for the process of WO 2019/115034.

Settling velocity requirements were met for the biomass separator.

Further, process cycles could be reduced.

A high performance at a VLR of at least 5 g COD/L day. Good SCOD removal and TCOD removal efficiencies were achieved.

We claim:

1. A process for treating an aqueous fluid comprising a biodegradable organic substance in an installation comprising:
a bioreactor unit, wherein the aqueous fluid is anaerobically microbiologically treated, whereby a biogas is produced from the biodegradable organic substance;
a batch degassing unit, wherein an aqueous suspension withdrawn from the bioreactor, said aqueous suspension comprising aqueous liquid, biogas and biomass, is subjected to batch degassing; and
a semi-continuously operated biomass separator unit, wherein the degassed suspension withdrawn from the degassing unit is subjected to separation into a sludge enriched in biomass and an aqueous fluid having reduced biomass content compared to said degassed aqueous suspension fed into the biomass separator unit,
the process comprising:
a bioreactor unit batch feeding stage (A), wherein the aqueous fluid that is to be treated is fed into the bioreactor unit;
a batch reaction stage (B), wherein the aqueous fluid is microbiologically treated under anaerobic conditions and biogas is produced in the bioreactor unit;
a semi-continuous biomass separator unit feeding stage (C), wherein the degassed aqueous suspension is withdrawn from the batch degassing unit and fed into the semi-continuous biomass separator, wherein the semi-continuous biomass separator unit feeding stage comprises an initial phase without withdrawal of aqueous fluid having reduced biomass content followed by a continuous phase wherein feeding and withdrawal take place continuously; and
a degassing unit feeding stage (E), wherein an aqueous suspension comprising microbiologically treated aqueous fluid and biomass is withdrawn from the bioreactor unit and fed batch-wise into the degassing unit.

2. The process according to claim 1, wherein the process comprises a plurality of cycles, wherein one or more subsequent process cycles are performed after a start-up cycle, in which subsequent cycle or cycles:
the bioreactor unit batch feeding stage (A) is performed, wherein the aqueous fluid that is to be treated is fed into the bioreactor unit, wherein treatment of aqueous fluid already present in the bioreactor unit may continue, the aqueous suspension in the degassing unit, fed into it in a previous stage or previous cycle, is subjected to degassing whilst use is made of mixing;
the batch reaction stage (B) is performed thereafter, wherein the batch of aqueous fluid is microbiologically treated and biogas is produced in the bioreactor unit and the aqueous suspension in the degassing unit is subjected to degassing;
the semi-continuous biomass separator unit feeding stage (C) is performed thereafter, wherein degassed aqueous suspension is withdrawn continuously from the degassing unit and fed into the biomass separator until the biomass separator fills up to a height level at which an outlet for aqueous fluid having reduced biomass content is present, and from then on during this stage continuous removal of the aqueous fluid having reduced biomass content from the biomass separator takes place and the sludge enriched in biomass to the bioreactor is returned continuously to the bioreactor unit, wherein microbiological treatment of the aqueous fluid in the bioreactor unit may continue;

a further sludge return stage (D) is performed thereafter, wherein feeding of degassed suspension from the degassing unit to the biomass separator has been completed, removal of the aqueous fluid having reduced biomass content from the biomass separator has stopped and sludge enriched in biomass continues to be returned to the bioreactor, wherein microbiological treatment in the bioreactor unit may continue; and the degassing unit feeding stage (E) is performed thereafter, wherein once the required volume of aqueous fluid having reduced biomass content is withdrawn from the biomass separator unit during previous stage, the remaining sludge enriched in biomass will then continue to be returned to the bioreactor in this stage, wherein microbiological treatment in the bioreactor unit may continue.

3. The process according to claim 2, wherein the aqueous fluid having reduced biomass content is withdrawn from the biomass separator unit via gravity overflow.

4. The process according to claim 1, wherein concentrated sludge (a) enriched in biomass is recycled to the bioreactor unit and clarified aqueous fluid (b) having reduced biomass content is removed from the biomass separator unit and discarded as effluent or subjected to further downstream processing.

5. The process according to claim 2, wherein recycle of the sludge and removal of clarified aqueous fluid take place during the biomass separator unit operation stage (C) or thereafter, yet before the start of the next of said stages (E) or (A).

6. The process according to claim 1, wherein the biomass separator unit has tilted internals adapted to enhance the settleability of the biomass.

7. The process according to claim 6, wherein the tilted internals define a volume between 1/2 and 1/3 of the working volume of the biomass separator unit.

8. The process according to claim 1, wherein the volume of the aqueous fluid that is being subjected to microbiological treatment in the bioreactor unit per batch is about 2 to about 3 times the volume of the aqueous suspension that is being degassed in the batch degassing unit.

9. The process according to claim 1, wherein the microbiological treatment in the bioreactor unit is anaerobic, and wherein anaerobic conditions are maintained in the bioreactor unit and the degassing unit.

10. The process according to claim 1, wherein the aqueous fluid is a fluid waste having a total chemical oxygen demand in the range of 1.0-50 g/l.

11. The process according to claim 1, wherein the aqueous fluid is a fluid waste having a total suspended solids content of 0.5 g/l or more.

12. The process according to claim 11, wherein the aqueous fluid is a fluid waste having a total suspended solids content of 1.0-30 g/l.

13. The process according to claim 1, wherein the aqueous fluid is a fluid waste having a total suspended solids content of 0-20 g/l.

14. The process according to claim 1, wherein the aqueous fluid is a fluid waste having a total content of fat oil and/or grease (FOG-content) in the range of 0-4 g/l.

15. The process according to claim 1, wherein the aqueous fluid is a fluid waste having a total content of fat oil and/or grease (FOG-content) of 50 mg/l or more.

16. The process according to claim 15, wherein the fluid waste has a FOG-content in the range of 0.1-2 g/l.

17. The process according to claim 2, wherein the aqueous suspension in the degassing unit is subjected to mixing and degassing.

18. The process according to claim 6, wherein said tilted internals are lamellae.

19. The process according to claim 10, wherein said total chemical oxygen demand is in the range of 5-50 g/l.

20. The process according to claim 19, wherein said total chemical oxygen content is in the range of 8-50 g/l.

21. The process according to claim 20, wherein said total chemical oxygen content is in the range of 8-30 g/l.

22. The process according to claim 1, wherein a required volume of aqueous fluid having reduced biomass content that is withdrawn from the biomass separator is equal to a volume fed to the bioreactor during the bioreactor unit batch feeding stage.

* * * * *